US008720059B2

(12) United States Patent
West (10) Patent No.: US 8,720,059 B2
(45) Date of Patent: May 13, 2014

(54) APPARATUS AND METHOD FOR AIRCRAFT ENGINE CORE EXCHANGE

(75) Inventor: Randall Ray West, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 1017 days.

(21) Appl. No.: 12/769,838

(22) Filed: Apr. 29, 2010

(65) Prior Publication Data
US 2011/0265327 A1    Nov. 3, 2011

(51) Int. Cl.
*B64F 5/00* (2006.01)
*F01D 25/28* (2006.01)

(52) U.S. Cl.
USPC ........ 29/889.2; 29/889.3; 29/889.4; 414/589; 248/544

(58) Field of Classification Search
CPC .............................. B64F 5/0036; F01D 25/285
USPC ............. 29/890.01, 889, 889.2, 889.1, 889.3, 29/889.4, 429, 464, 729, 732, 760; 414/589, 800, 137.1; 248/544
See application file for complete search history.

(56) References Cited

U.S. PATENT DOCUMENTS

| | | | | |
|---|---|---|---|---|
| 3,150,784 A * | 9/1964 | Rothe | ........................... | 414/678 |
| 4,412,774 A * | 11/1983 | Legrand et al. | ............... | 414/589 |
| 4,440,265 A * | 4/1984 | Spagnoli | ....................... | 182/129 |
| 4,861,218 A * | 8/1989 | Lamer | ............................ | 414/461 |
| 5,383,652 A * | 1/1995 | Van Den Berg | ................ | 269/17 |
| 5,816,367 A * | 10/1998 | Lilja et al. | ..................... | 187/244 |
| 5,860,275 A * | 1/1999 | Newton et al. | .............. | 60/226.1 |
| 5,870,824 A * | 2/1999 | Lilja et al. | ..................... | 29/889.1 |
| 6,170,141 B1 * | 1/2001 | Rossway et al. | ............. | 29/281.1 |
| 6,292,999 B1 * | 9/2001 | Rossway et al. | ................ | 29/559 |
| 6,298,536 B1 * | 10/2001 | Rossway et al. | ............. | 29/281.1 |
| 6,485,247 B1 * | 11/2002 | Groves et al. | ................. | 414/589 |
| 7,770,292 B2 * | 8/2010 | Stretton | ....................... | 29/889.1 |
| 8,262,050 B2 * | 9/2012 | Linz | ............................. | 248/554 |
| 2008/0011932 A1 * | 1/2008 | Stretton | ....................... | 248/544 |
| 2010/0155566 A1 * | 6/2010 | Linz | ............................. | 248/554 |

\* cited by examiner

*Primary Examiner* — Peter DungBa Vo
*Assistant Examiner* — Kaying Kue
(74) *Attorney, Agent, or Firm* — Hovey Williams LLP (57) ABSTRACT

A method and ground support equipment (GSE) for attaching an engine core to an engine fan module on an aircraft pylon. The GSE may comprise GSE supports and lifting components attached to the pylon, two suspension rails attached to the lifting components, two translating rails translatably attached to the two suspensions rails and fixedly attached to opposite sides of the engine core, and two alignment fittings fixed to the engine fan module. The method of using the GSE may comprise lifting the engine core vertically using the lifting components and anchoring the suspension rails to the alignment fittings. The translating rails and engine core may then be translated in an aft-to-forward direction such that portions of the translating rails engage portions of the alignment fittings to cooperatively guide the translating rails into a final forward position in which the engine core is aligned relative to the engine fan module.

18 Claims, 9 Drawing Sheets

APPARATUS AND METHOD FOR AIRCRAFT ENGINE CORE EXCHANGE

BACKGROUND

1. Field

Embodiments of the present invention relate to methods and devices for mounting aircraft engine cores.

2. Related Art

Various aircraft engine core transport systems are used for mounting or removing an aircraft engine core into or out of a nacelle or engine fan module. However, these engine core transport systems are generally large and require removal of various nacelle components in order to insert or remove the engine core. This increases the amount of labor and time involved in exchanging an aircraft engine core. Furthermore, many prior art methods for installing engine cores do not accurately and efficiently align the engine cores with the engine fan modules.

Accordingly, there is a need for an improved method and apparatus for mounting or removal of an aircraft engine core that overcomes the limitations of the prior art.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

Embodiments of the present invention solve the above-mentioned problems and provide a distinct advance in the art of aircraft engine core exchange. More particularly, embodiments of the present invention provide ground support equipment (GSE) for installation and/or removal of an engine core from an engine fan module of an aircraft nacelle.

The GSE is configured for attachment to a pylon supporting the aircraft nacelle and engine fan module. An embodiment of the GSE may comprise forward and aft GSE supports attached to the pylon, one or more lifting components extending from the GSE supports, at least two suspension rails and at least two translating rails, each translatably connected to one of the suspension rails. The lifting components are fixed to the suspension rails and are configured to provide vertical actuation of the suspension rails. The translating rails are fixed to the engine core and are configured to translate in an aft-to-forward direction relative to the suspension rails.

The GSE may also comprise one or more alignment fittings configured for attachment to the engine fan module. Forward ends of the translating rails may mate with or engage portions of the alignment fittings when translated in the aft-to-forward direction and physically guide the translating rails. This orients the engine core relative to the engine fan horizontally, vertically, and/or rotatably. For example, v-shaped notches formed in the forward ends of the translating rails may engage with alignment pins protruding from the alignment fittings. Additionally or alternatively, a ramped portion of the alignment fittings may mate with a beveled outer surface of the translating rails. The alignment fittings cooperatively guide the translating rails at least one of horizontally, vertically, and rotationally to a final forward position in which the engine core is in a desired orientation relative to the engine fan module.

The lifting components may comprise at least one of ropes, cords, wire, or chains taken up and let out by an actuator to vertically lift the suspension rails and the engine core. The translating rails may be translatable relative to the suspension rail via a rack and pinion gear system, slider rails and fittings, or by any method of translating one object relative to another.

A method for attaching an engine core to an engine fan module using the GSE may comprise fixedly attaching two translating rails to opposing sides of the engine core and translatably attaching two suspension rails to the two translating rails. Then the rails and the engine core may be lifted vertically using one or more lifting components attached to the pylon and the suspension rails. The lifting components may be independently actuated to achieve a proper tilt and alignment of the engine core. Once a center axis of the engine core is approximately aligned with a center axis of the engine fan module, the suspension rails may each be anchored to an alignment fitting mounted to the engine fan module.

The translating rails may then be translated by a lateral actuation assembly, translating the engine core in an aft-to-forward direction toward the engine fan module. As the translating rails move forward, forward ends of the translating rails each engage the alignment fittings. Thus, the alignment fittings cooperatively guide the translating rails horizontally, vertically, and/or rotationally to a final forward position in which the engine core is in a desired orientation relative to the engine fan module.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
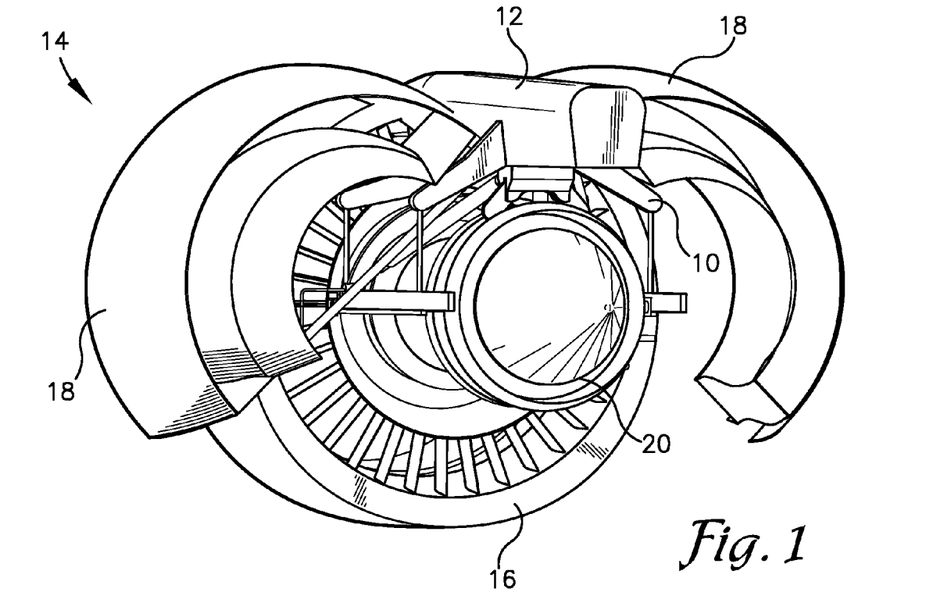
FIG. 1 is a perspective view of a pylon, a nacelle with thrust reverser halves in an open position, an engine core, and ground support equipment (GSE) constructed in accordance with an embodiment of the present invention.
Figure 2:
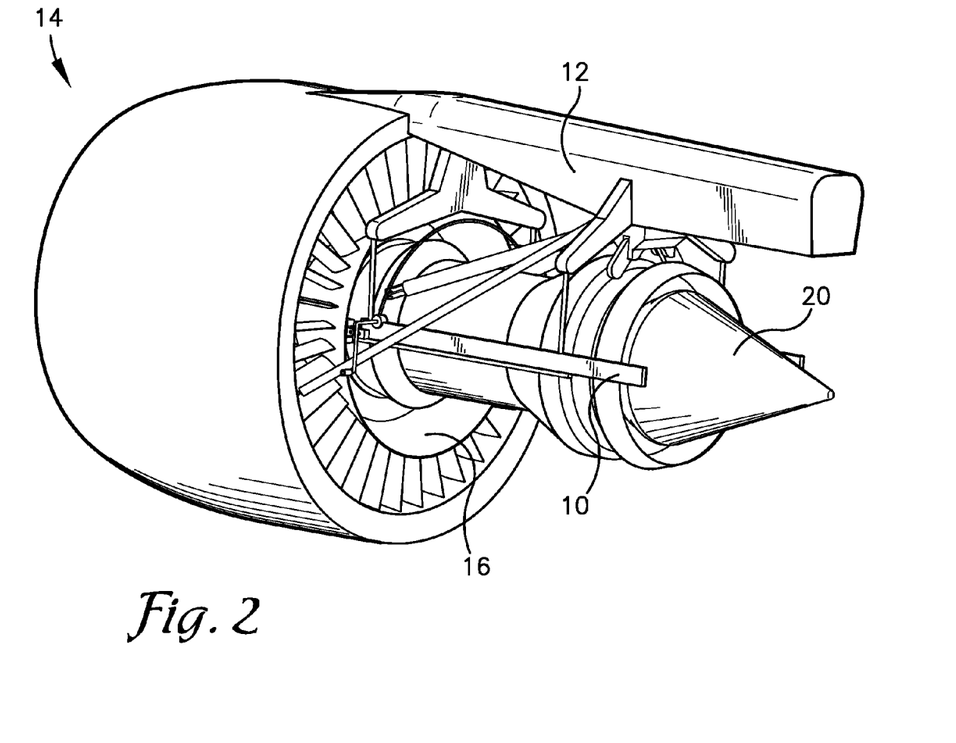
FIG. 2 is a perspective view of the pylon, nacelle, engine core, and GSE of FIG. 1 with the thrust reverser halves removed.
Figure 3:
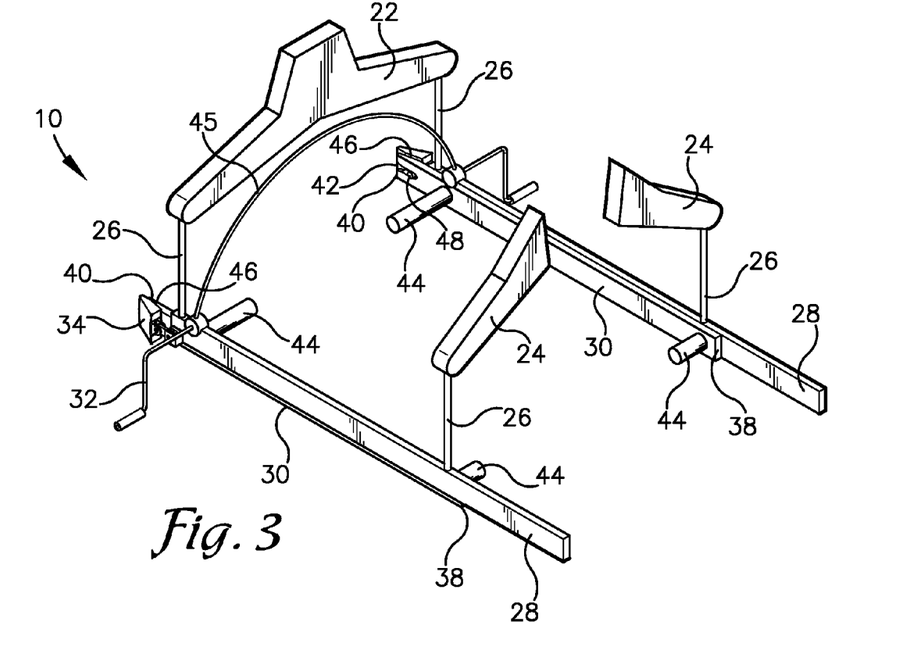
FIG. 3 is a perspective view of the GSE of FIG. 1.

Embodiments of the present invention are illustrated in FIGS. 1-3 and include ground support equipment (GSE) 10 attachable to an aircraft pylon 12 supporting a nacelle 14, an engine fan module 16, and two fan duct or thrust reverser halves 18. The GSE 10 is configured to transport and align an engine core 20 with the engine fan module 16 for attachment thereto. The engine fan module 16 may include an engine fan and an engine fan casing attached to various other nacelle components. The fan duct or thrust reverser halves 18 may be translatably and/or pivotally attached to the pylon 12, thus providing access to the engine core without being removed from the pylon 12 or nacelle 14. In alternative embodiments of the invention, the fan duct or thrust reverser halves 18 are integrally formed together and integrated with the engine fan module 16 such that they do not hinge open for access to the engine.

Figure 4:
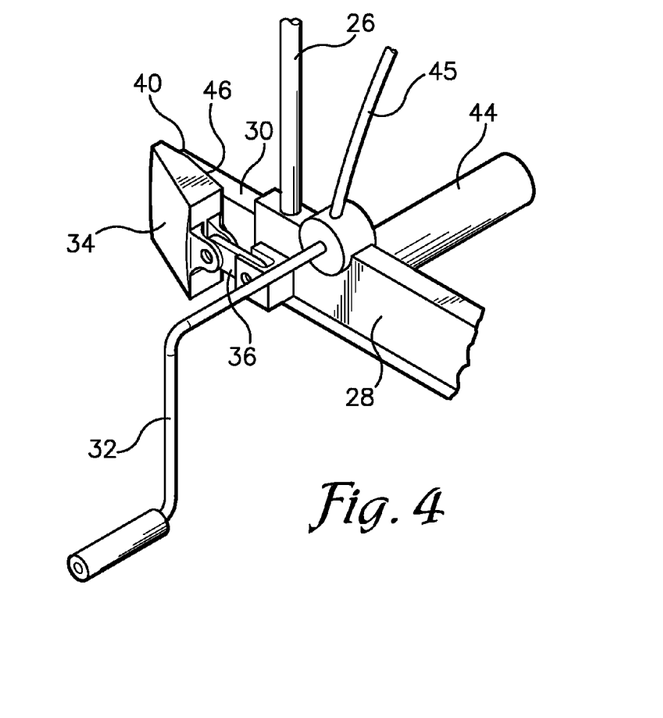
FIG. 4 is a fragmentary perspective view of a portion of the GSE of FIG. 3.

Embodiments of the GSE 10, further illustrated in FIGS. 3-4, may comprise a forward GSE support 22, one or more aft GSE supports 24, lifting components 26, one or more suspension rails 28, one or more translating rails 30, a lateral actuation assembly 32, and one or more alignment fittings 34 fixed to the engine fan module 16. The forward and aft GSE supports 22,24 may be fixedly attached to the pylon 12. The lifting components 26 may be attached to the GSE supports 22,24 and are configured for vertically lifting the rails 28,30 and the engine core 20. The suspension rails 28 may be fixed to the lifting components 26. The translating rails 30 may be fixed to the engine core 20 and translatably attached to the suspension rails 28, such that the lateral actuation assembly 32 may translate the engine toward and away from the engine fan module 16.

The forward and aft GSE supports 22,24 may be formed of any rigid material meeting or surpassing minimum strength requirements for supporting the other components of the GSE 10 and the engine core 20. In some embodiments of the invention, the forward GSE support 22 is bolted or otherwise mounted at a first location on the pylon 12 and the aft GSE supports 24 are bolted or otherwise mounted at a second location on the pylon 12 which is located a distance aftward of the first location. Note that any number of forward and aft supports 22,24 may be attached to the pylon 12 for supporting the load of the engine core 20 and the rails 28,30. Furthermore, in some embodiments of the invention, the aft GSE support 24 may be a single, integral component, and/or the forward GSE support 22 may include a plurality of components attached to the pylon 12.

The lifting components 26 may comprise one or more of a block and tackle system, chains, ropes, wires, and any vertical actuation system for vertically lifting and lowering the rails 28,30 and engine core 20. In the embodiment illustrated in FIG. 3, the lifting components 26 include two cords of tackle extending from the forward GSE support 22, and one cord extending from each of the aft GSE supports 24. A mechanical and/or electrical vertical actuation system (not shown) may be housed within or otherwise attached to the forward and aft GSE supports 22,24 for taking up or letting out a desired amount of cord therefrom. Ends of the cords opposite of the GSE supports 22,24 may be fixedly attached to the suspension rails 28.

In some embodiments of the invention, the suspension rails 28 may be attached to the lifting components 26 after the engine core 20 is attached to the translating rails 30, as later described herein. The suspension rails 28 may also be configured to fixedly attach to the alignment fitting 34 on the engine fan module 16 once the lifting components 26 lift the suspension rails 28 to a desired vertical height. For example, a connecting link 36, as illustrated in FIG. 4, may be bolted or otherwise mechanically fastened to at least one of the alignment fittings 34 and/or one of the suspension rails 28.

Each of the translating rails 30 may include an aft end 38 and a forward end 40 forked to form a notch 42 therein, as illustrated in FIG. 3. The notch 42 is configured for mating with or engaging a portion of the alignment fitting 34 for providing proper vertical and rotational alignment of the engine core 20. The notch 42 may have substantially beveled side walls proximate the forward end 40 and may narrow toward an aft boundary thereof. In one embodiment of the invention, the notch 42 may have a "v" shape. Furthermore, proximate the forward end 40, the translating rails 30 may be beveled or comprise a ramp on an outward surface thereof facing the alignment fittings 34 and operable to interface with a portion of the alignment fittings 34, as later described herein.

The translating rails 30 may further include engine core attachment components 44 operable to attach to the engine core 20. For example, the attachment components 44 may be inserted into openings formed in a housing of the engine core 20, bolted or otherwise mechanically attached to the engine core 20.

The lateral actuation assembly 32 may be any apparatus for hydraulically, mechanically, and/or electrically translating the translating rails 30 relative to the suspension rails 28. For example, the lateral actuation assembly 32 may include a hand crank extending through a portion of at least one of the suspension rails 28 that turns a wheel or pinion which engages a rack attached to or formed on the translating rails 30, urging the translating rails 30 forward or aftward. The lateral actuation assembly 32 may comprise two identical assemblies, one for actuating each of the translating rails 30. In some embodiments of the invention, the lateral actuation assembly 32 is synchronized through a cable 45, mechanically, and/or electronically, such that the translating rails 30 move together.

The alignment fittings 34, as illustrated in FIGS. 3-6, may be bolted or otherwise mechanically attached to the engine fan module 16, such as to an inner wall of an engine fan casing. The alignment fittings 34 may each have an angled wall forming a ramp portion 46, and an alignment pin 48 extending from the ramp portion 46 toward a center axis of the nacelle 14. The ramp portion 46 may be beveled or inclined toward the center axis of the nacelle 14 in an aft-to-forward direction, such that the beveled outer surface at the forward end 40 of the translating rails 30 may engage with the ramp portion 46 to horizontally align the engine core 20. The alignment pins 48 of each of the alignment fittings 34 may engage sidewalls of the notch 42, thereby rotatably and vertically aligning the engine core 20. The beveled portions of the side walls in the notch 42 provide ramps for the alignment pin 48 to slide on if the engine core 20 or the rails 30 are slightly askew, such that as the translating rails 30 move forward, the engine core 20 either raises vertically and/or twists axially into a desired orientation.

In operation, the GSE 10 may be used to vertically lift and then laterally translate the engine core 20 into a desired position and orientation to be attached to the engine fan module 16. Once the engine core 20 is attached to the engine fan module 16, the GSE 10 may be removed from the pylon 12 and the nacelle 14. In some embodiments of the invention, the GSE 10 may also be used to remove an engine core 20 from an engine fan module 16.

Figure 14:
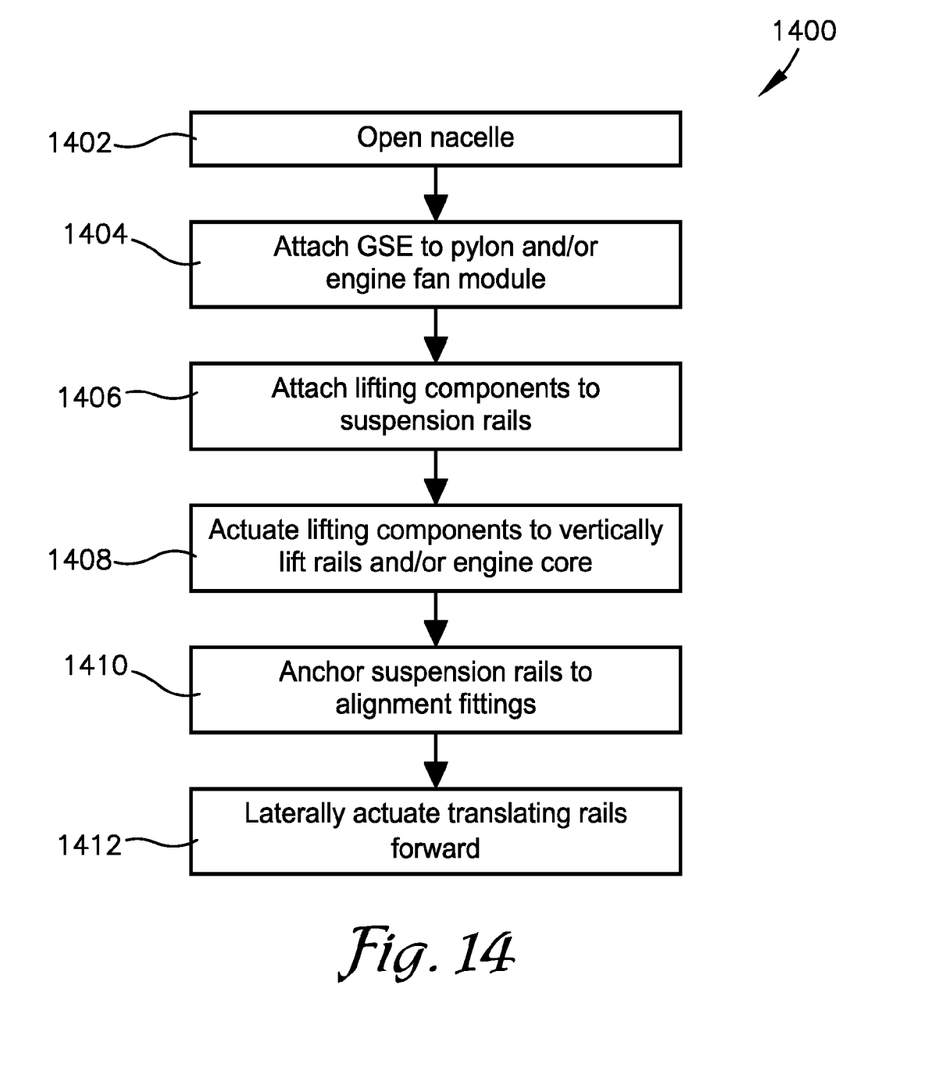
FIG. 14 is a flow chart of a method of aligning an engine core with an engine fan module for attachment thereto according to an embodiment of the present invention.

FIG. 14 illustrates a method 1400 of installing or exchanging an engine core 20 using the GSE 10. In some alternative implementations, the functions noted in the various blocks may occur out of the order depicted in FIG. 14. For example, two blocks shown in succession in FIG. 14 may in fact be executed substantially concurrently, or the blocks may sometimes be executed in the reverse order depending upon the functionality involved.

First, the nacelle 14 may be opened, as depicted in step 1402, and then the GSE 10 may be attached to the pylon 12 and/or engine fan module 16, as depicted in step 1404. As mentioned above, the fan duct or thrust reverser halves 18 may be translatably and/or pivotally attached to the pylon 12, thus providing access to the engine core 20 without being removed from the pylon 12 or nacelle 14. In alternative embodiments of the invention, the fan duct or thrust reverser may be integrally formed and thus unable to open, thus requiring the use of additional GSE supports 22,24 and/or longer rails 28,30 to laterally transport the engine core 20 to the engine fan module 16.

Figure 7:
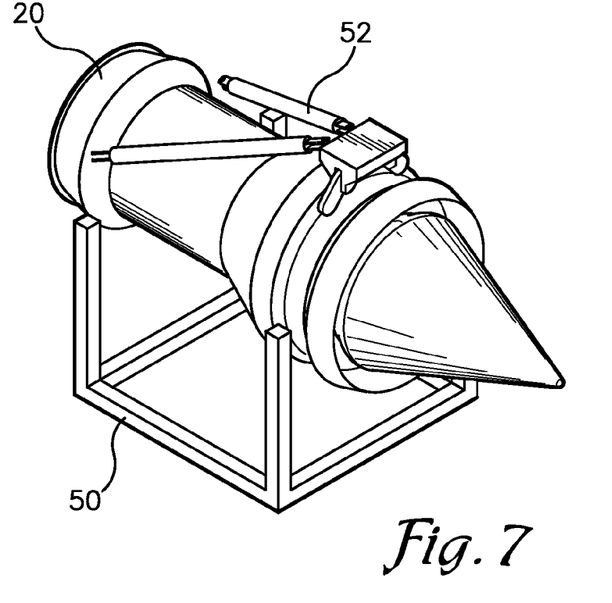
FIG. 7 is a perspective view of the engine core of FIG. 1 on an engine core stand.

The engine core 20 may be shipped or delivered on an engine stand 50, as illustrated in FIG. 7. Furthermore, the engine core 20 may comprise or be attached to one or more engine core supports 52 for mounting the engine core 20 to the pylon and/or to stabilize the engine core 20. For example, the engine core supports 52 may comprise engine mount hangers, thrust reverser links, and the like.

Figure 8:
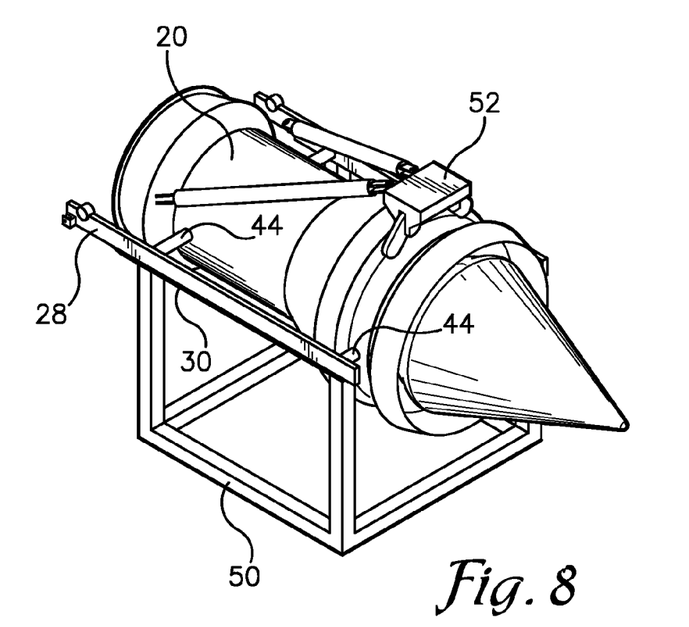
FIG. 8 is a perspective view of the engine core attached to the translating rail of FIG. 6.

The step of attaching the GSE 10 may comprise attaching the forward and aft GSE supports 22,24 to the pylon 12 and the engine core 20 to the translating rails 30, as illustrated in FIG. 8. In some embodiments of the invention, additional fan module stabilization rods 54 may be connected to the engine fan module 16 and/or the pylon 12 to stabilize these components during engine core exchange. For example, mechanical connectors such as lug/clevis pinned joints or bolts may connect one end of each of the rods 54 to an outer casing of the engine fan module 16 and attach an opposing end of the rods 54 to the GSE supports 22,24 and/or the pylon 12 via dedicated fittings attached thereto.

Figure 9:
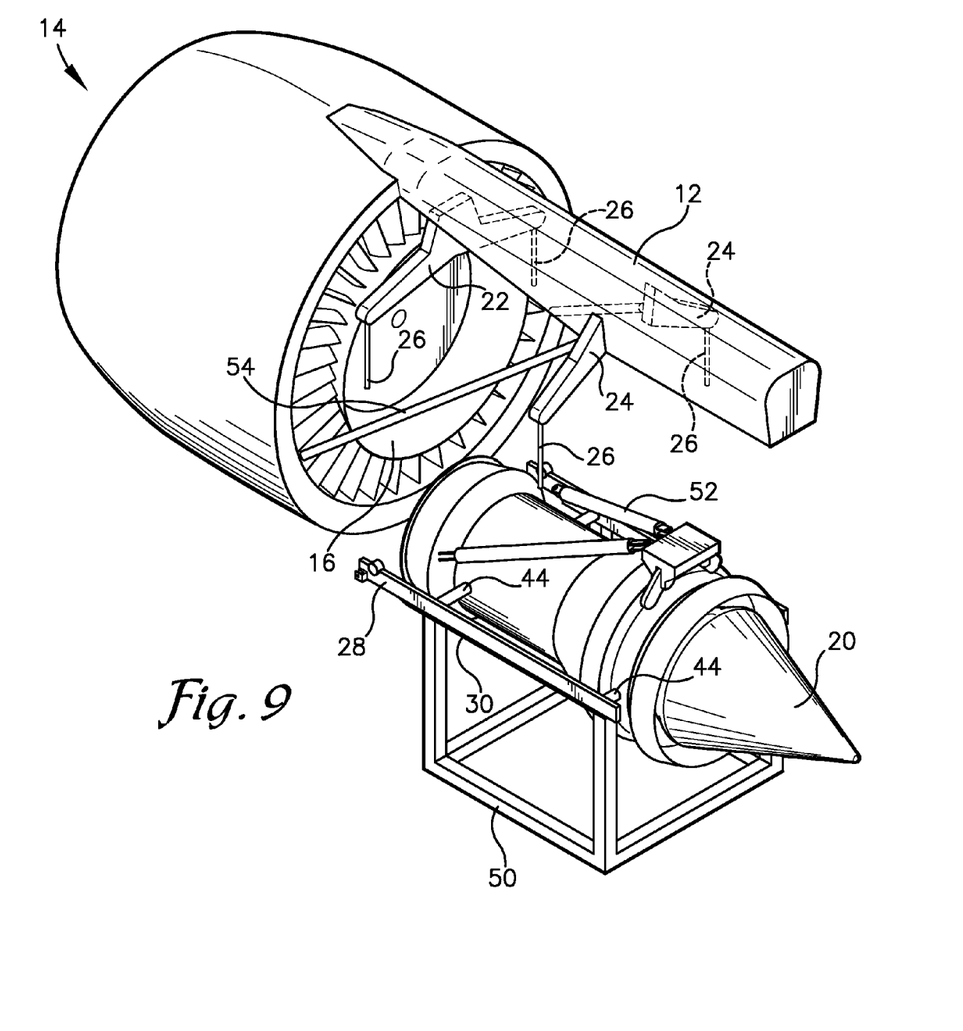
FIG. 9 is a perspective view of the pylon, engine core, engine fan module, and GSE of FIG. 1 prior to attachment of suspension rails of the GSE to lifting components of the GSE.
Figure 10:
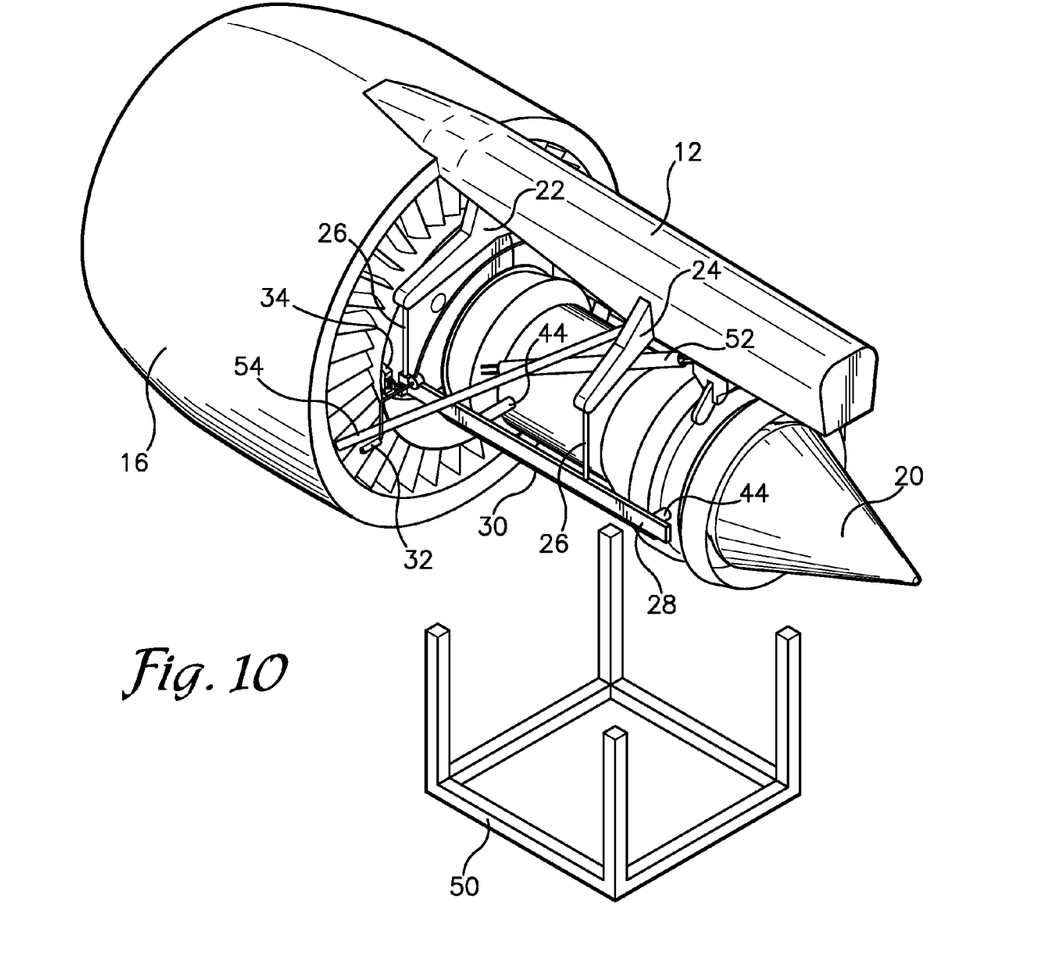
FIG. 10 is a perspective view of the pylon, engine core, engine fan module, and GSE of FIG. 9 following a vertical lifting of the engine core toward the pylon.

Then, the lifting components 26 may be attached to one or more of the rails 28,30, as depicted in step 1406 and illustrated in FIGS. 9-10, at opposing sides of the engine core 20. Once the lifting components 26 are attached to the rails 28,30, the engine stand 50 may be removed from the engine core 20, as illustrated in FIG. 10.

Figure 11:
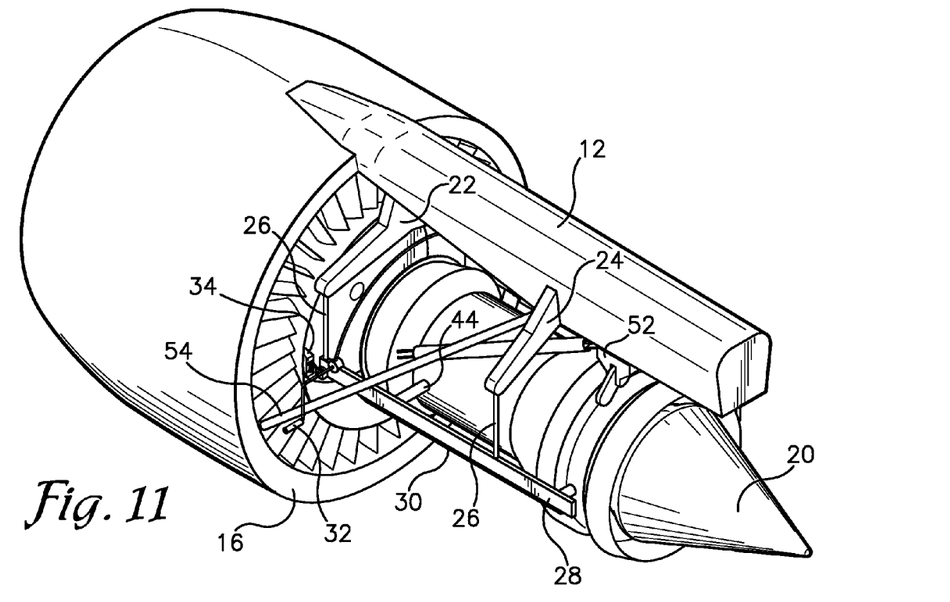
FIG. 11 is a perspective view of the pylon, engine core, engine fan module, and GSE of FIG. 9 following the vertical lifting of the engine core toward the pylon and following removal of the engine core stand.
Figure 12:
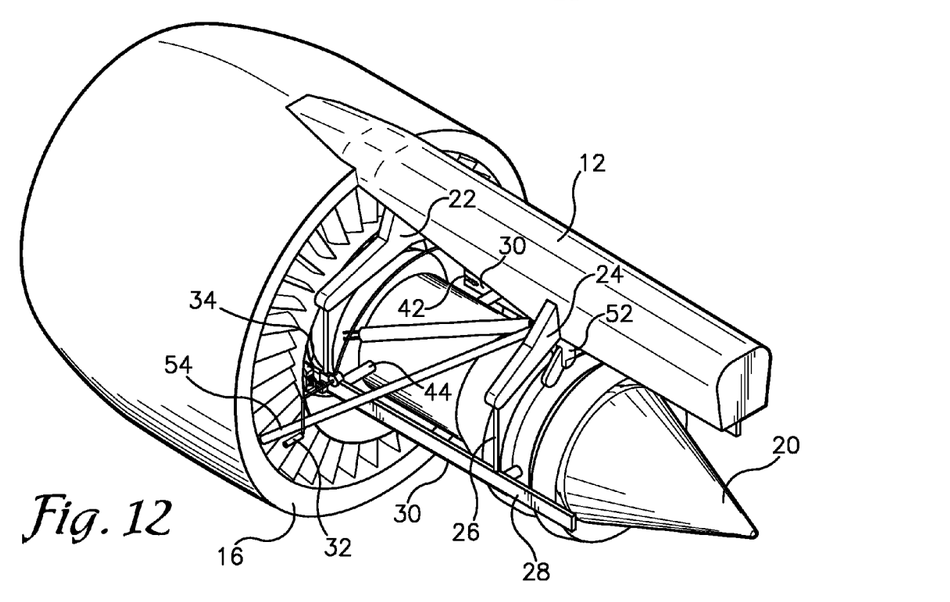
FIG. 12 is a perspective view of the pylon, engine core, engine fan module, and GSE of FIG. 11 following a lateral translation of the engine core toward the fan module.

The lifting components 26 may then be actuated to vertically lift the engine core 20 until a center axis of the engine core 20 and a center axis of the engine fan module 16 are approximately aligned, as depicted in step 1408 and illustrated in FIGS. 10-11. In some embodiments of the invention, the lifting components 26 may each be individually actuated, such that a particular side or end of the engine core 20 may be raised or lowered as desired to provide fine-tuned control of orientation and height. An operator may visually determine if the center axes of the engine core 20 and the engine fan module 16 are aligned, or the lifting components 26 may be configured to lift the engine core 20 by a desired amount according to various measurements and specifications.

Once the engine core 20 is lifted vertically by a desired amount, the suspension rails 28, at or proximate a forward end thereof, may be anchored to the alignment fittings 34 via the connecting link 36, as illustrated in FIG. 4 and as depicted in step 1410. Alternatively, the suspension rails 28 may be anchored directly to the engine fan module 16 using any suitable mechanical connection. Then, as depicted in step 1412, the lateral actuation assembly 32 may actuate the translating rails 30 to move in an aft-to-forward direction until each of the alignment pins 48 are engaged with an aft-most wall of the notch 42 in each of the translating rails 30, as illustrated in FIGS. 3, 5-6, and 12. The distance of lateral actuation may again be determined by an operator, or the lateral actuation assembly 32 may be configured to translate the translating rail 30 by a predetermined lateral distance. In some embodiments of the invention, a sensor (not shown) may determine when the pins 48 are fully engaged with the notches 42 and send a signal to the lateral actuation assembly 32 to stop actuation.

Figure 5:
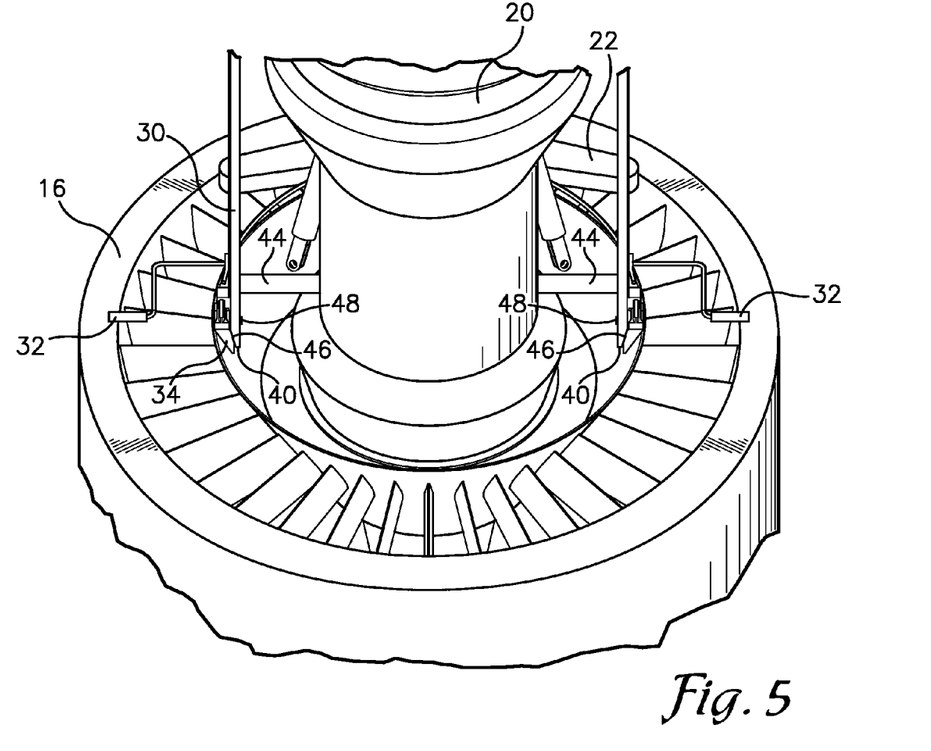
FIG. 5 is a fragmentary perspective view of an engine fan module of the nacelle of FIG. 1, the engine core, and the GSE.
Figure 6:
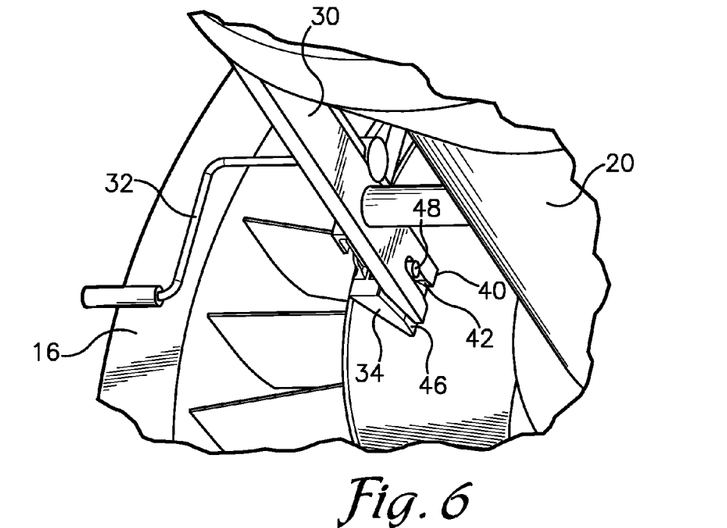
FIG. 6 is a fragmentary perspective view of the engine fan module, the engine core, and the GSE of FIG. 5, with an alignment fitting of the GSE engaging a portion of a translating rail of the GSE.

As noted above, the beveled outer surface at the forward end 40 of the translating rails 30 may engage with the ramp portion 46 of the alignment fittings 34 to horizontally orient the engine core 20, as illustrated in FIGS. 5-6. The alignment pins 48 of each of the alignment fittings 34 may engage sidewalls of the notch 42, rotatably and vertically orient the engine core 20. The beveled surfaces, notches 42, and alignment pins 48 described herein may be generally referred to as alignment features, which may cooperatively guide the translating rails 30 horizontally, vertically, and/or rotationally into a final forward position in which the engine core 20 is in a desired orientation relative to the engine fan module 16.

In some embodiments of the invention, the alignment fittings 34 may be customized to fine tune horizontal, vertical, and rotational alignment of the engine core 20. For example, a wedge may be inserted between a gap between the beveled surfaces of the alignment fittings 34 and the translating rails 30 to shift the horizontal position of the engine core's axis into final alignment.

Figure 13:
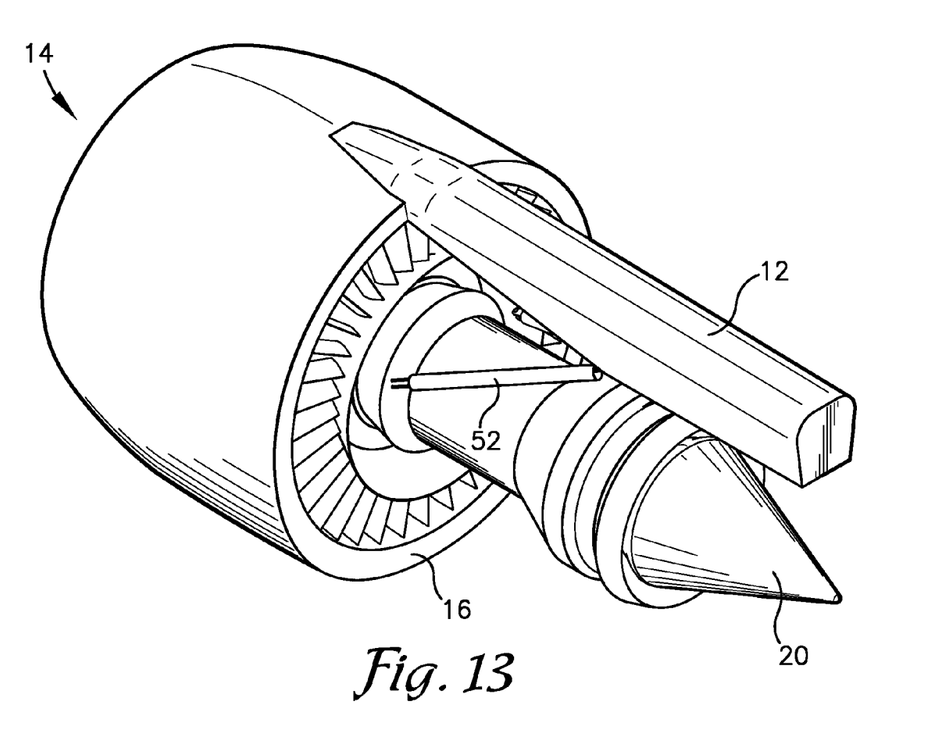
FIG. 13 is a perspective view of the engine core attached to the engine fan module of FIG. 12 with the GSE removed therefrom.

Once the engine core 20 is properly positioned and oriented, the engine core 20 may be attached to the engine fan module 16 using any suitable attachment devices or methods. Additionally, the engine core 20 may be anchored to the pylon 12, such as via the engine core supports 52. Then the GSE 10 may be removed from the nacelle 14, as illustrated in FIG. 13. Specifically, the suspension rails 28 may be disconnected from the engine fan module 16 and/or the alignment fittings 34, and the translating rails 30 may be disconnected from the engine core 20. Furthermore, the forward and aft GSE supports 22,24 may be disconnected from the pylon 12 and/or the alignment fittings 34 may be disconnected from the engine fan module 16.

In alternative embodiments of the invention, the forward and aft GSE supports 22,24 may be permanently or integrally attached to the pylon 12 and configured to attach an aft portion of the engine core 20 to the pylon 12 before, during, or after removal of other GSE 10 components. Once the GSE 10 is disconnected from the pylon 12 and nacelle 14, the fan duct or thrust reverser halves 18 may be pivoted closed, such that the fan duct or thrust reverser substantially surrounds the engine core 20.

In some embodiments of the invention, the GSE may be attached to the pylon 12 and an engine core that is currently attached to the engine fan module 16, to remove the engine core 20 from the engine fan module 16, such as when an old engine core must be exchanged with a new engine core.

The compactness of the GSE 10 described herein provides the advantage of easy transport to unimproved airfields to perform engine core exchanges, such as gas turbine engine core exchanges. Furthermore, the discrete means disclosed herein, such as the notch 42 and the ramp portion 46 of the alignment fittings 34, provide for more accurate and efficient guiding and alignment of the engine core 20 to the engine fan module 16.

Although the invention has been described with reference to the preferred embodiment illustrated in the attached drawing figures, it is noted that equivalents may be employed and substitutions made herein without departing from the scope of the invention as recited in the claims. For example, the concept described herein could be applied to any nacelle/engine arrangement and is not limited to the nacelle/engine arrangements described herein. Furthermore, while a system having four connection points between the rails 28,30 and the forward and aft GSE supports 22,24 are illustrated herein, the system may have more or less connection points and more or less rails and GSE supports without departing from the scope of the invention. Finally, any components of the GSE 10 may be integral with the nacelle 14, pylon 12, and/or engine fan module 16. For example, one or more of the alignment fittings 34 may be integral with the engine fan module 16.

Having thus described various embodiments of the invention, what is claimed as new and desired to be protected by Letters Patent includes the following:

1. A method for attaching an engine core to an engine fan module that is attached to an aircraft pylon on an aircraft wing, the method comprising:
   attaching two translating rails to opposing sides of the engine core, wherein the translating rails are translatably attached to two suspension rails;
   lifting the engine core vertically using one or more lifting components attached to the pylon and the suspension rails;
   attaching the suspension rails to at least one of the alignment fittings and the engine fan module following lifting the engine core with the lifting components; and
   translating the translating rails and engine core in an aft-to-forward direction toward the engine fan module such that forward ends of the translating rails engage one or more alignment fittings fixed to or integral with the engine fan module, such that the alignment fittings cooperatively guide the translating rails at least one of horizontally, vertically, and rotationally to a final forward position in which the engine core is in a desired orientation relative to the engine fan module.

2. The method of claim 1, wherein the forward ends of the translating rails comprise a notch having one or more sidewalls, wherein the sidewalls include at least one beveled portion.

3. The method of claim 2, wherein the alignment fittings comprise an alignment pin which engages the sidewalls of the translating rails when the translating rails are translated in the aft-to-forward direction, thereby vertically or rotationally orienting the engine core relative to the engine fan module.

4. The method of claim 2, wherein the notch narrows in a forward-to-aft direction.

5. The method of claim 1, wherein the alignment fittings comprise a ramped portion gradually extending inward toward a center axis of the engine fan module in an aft-to-forward direction.

6. The method of claim 5, wherein the translating rails each include a beveled outer surface proximate the forward ends thereof, such that the beveled outer surface mates with the ramped portion of the alignment fittings when the translating rails are translated in the aft-to-forward direction, thereby horizontally orienting the engine core relative to the engine fan module.

7. The method of claim 1, wherein the lifting components are attached to the pylon via one or more GSE supports and wherein a vertical tilt and vertical alignment of the engine core is controlled by independent, individual actuation of each of the lifting components.

8. A method for attaching an engine core to an engine fan module that is attached to an aircraft pylon on an aircraft wing, the method comprising:
   attaching two translating rails to opposing sides of the engine core, wherein the translating rails are translatably attached to two suspension rails;
   lifting the engine core vertically using one or more lifting components attached to the pylon and the suspension rails;
   attaching the suspension rails to at least one of the alignment fittings and the engine fan module; and
   translating the translating rails and engine core in an aft-to-forward direction toward the engine fan module such that forward ends of the translating rails each engage one of two alignment fittings fixed to the engine fan module, such that the alignment fittings cooperatively guide the translating rails at least one of horizontally, vertically, and rotationally to a final forward position in which the engine core is in a desired orientation relative to the engine fan module,
   wherein the alignment fitting comprise a ramped portion gradually extending inward toward a center axis of the engine fan module in an aft-to-forward direction.

9. The method of claim 8, wherein the forward ends of the translating rails comprise a v-shaped notch.

10. The method of claim 9, wherein the alignment fittings comprise an alignment pin which engages with the v-shaped notch when the translating rails are translated in the aft-to-forward direction, thereby vertically or rotationally orienting the engine core to its final forward position.

11. The method of claim 8, wherein the translating rails each include a beveled outer surface proximate the forward ends thereof, such that the beveled outer surface mates with the ramped portion of the alignment fittings when the translating rails are translated in the aft-to-forward direction, thereby horizontally orienting the engine core relative to the engine fan module.

12. The method of claim 8, further comprising vertically tilting and aligning the engine core by independently actuating each of the lifting components.

13. A method for attaching an engine core to an engine fan module that is attached to an aircraft pylon on an aircraft wing, the method comprising:
attaching two translating rails to opposing sides of the engine core, wherein the translating rails are translatably attached to two suspension rails;
lifting the engine core vertically using one or more lifting components attached to the pylon and the suspension rails; and
translating the translating rails and engine core in an aft-to-forward direction toward the engine fan module such that forward ends of the translating rails engage one or more alignment fittings fixed to or integral with the engine fan module, such that the alignment fittings cooperatively guide the translating rails at least one of horizontally, vertically, and rotationally to a final forward position in which the engine core is in a desired orientation relative to the engine fan module,
wherein the alignment fittings comprise a ramped portion gradually extending inward toward a center axis of the engine fan module in an aft-to-forward direction.

14. The method of claim 13, wherein the translating rails each include a beveled outer surface proximate the forward ends thereof, such that the beveled outer surface mates with the ramped portion of the alignment fittings when the translating rails are translated in the aft-to-forward direction, thereby horizontally orienting the engine core relative to the engine fan module.

15. The method of claim 13, further comprising vertically tilting and aligning the engine core by independently actuating each of the lifting components.

16. The method of claim 13, wherein the forward ends of the translating rails have a notch formed therein.

17. The method of claim 16, wherein the alignment fittings comprise an alignment pin which engages the translating rails within the notch when the translating rails are translated in the aft-to-forward direction, thereby vertically or rotationally orienting the engine core relative to the engine fan module.

18. The method of claim 16, wherein the notch narrows in a forward-to-aft direction.

* * * * *